(12) United States Patent
Nguyen et al.

(10) Patent No.: US 6,529,553 B2
(45) Date of Patent: Mar. 4, 2003

(54) HVQ COMPRESSION FOR IMAGE BOUNDARIES

(75) Inventors: Uoc H. Nguyen, Long Beach, CA (US); Kien T. Nguyen, Torrance, CA (US); Abraham E. Claproth, Culver City, CA (US); Weili Lin, Irvine, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/123,786

(22) Filed: Apr. 15, 2002

(65) Prior Publication Data

US 2002/0110196 A1 Aug. 15, 2002

Related U.S. Application Data

(63) Continuation of application No. 09/106,732, filed on Jun. 29, 1998.

(51) Int. Cl.[7] .................................................. H04N 7/12
(52) U.S. Cl. .................................................. 375/240.22
(58) Field of Search ..................... 375/240.22; 358/462; 382/176; H04N 7/12

(56) References Cited

U.S. PATENT DOCUMENTS

| | | | |
|---|---|---|---|
| 4,553,172 A | 11/1985 | Yamada et al. | 358/280 |
| 4,679,094 A | 7/1987 | Rutherford et al. | 358/261 |
| 4,745,473 A | 5/1988 | Hall | 358/133 |
| 4,797,945 A | 1/1989 | Suzuki et al. | 382/56 |
| 5,140,417 A | 8/1992 | Tanaka et al. | 358/133 |
| 5,253,058 A | 10/1993 | Gharavi et al. | 358/136 |
| 5,272,529 A | 12/1993 | Frederiksen | 358/133 |
| 5,339,164 A | 8/1994 | Lim | 358/261.1 |
| 5,410,350 A | 4/1995 | Kato et al. | 348/400 |
| 5,452,104 A | 9/1995 | Lee | 358/433 |
| 5,517,327 A | 5/1996 | Nakatani et al. | 358/462 |
| 5,541,594 A | 7/1996 | Huang et al. | 341/51 |
| 5,602,589 A | 2/1997 | Vishwanath et al. | 348/398 |
| 5,689,588 A | 11/1997 | Rombola et al. | 382/237 |
| 5,751,865 A | 5/1998 | Micco et al. | 382/296 |
| 5,757,852 A | 5/1998 | Jericevic et al. | 375/240 |
| 5,764,802 A | 6/1998 | Simon | 382/236 |
| 5,767,978 A * | 6/1998 | Revankar et al. | 382/176 |
| 5,831,678 A | 11/1998 | Proctor | 348/422 |
| 5,870,502 A | 2/1999 | Bonneau et al. | 382/249 |
| 5,999,710 A | 12/1999 | Smith et al. | 395/114 |
| 6,078,696 A | 6/2000 | Nguyen et al. | 382/253 |
| 6,154,572 A | 11/2000 | Chaddha | 382/253 |
| 6,205,252 B1 | 3/2001 | Nguyen et al. | 382/234 |

FOREIGN PATENT DOCUMENTS

| | | |
|---|---|---|
| EP | 0 358 815 A | 3/1990 |
| EP | 06 141187 | 5/1994 |
| EP | 0 605 893 A | 7/1994 |
| EP | 0 701 375 A | 3/1996 |
| EP | 0 856 988 A | 8/1998 |
| WO | WO 91 01609 A | 2/1991 |

OTHER PUBLICATIONS

Lo, S–C B., Li, Huai, Krasner, B. H., Freedman, M. T., Mun, S. K., A Contour Coding And Full–Frame Compression Of Discrete Wavelet And Cosine Transforms Oct. 1995, p. 9–12, vol. 2 Image Processing, 1995. Proceedings., International Conference on.

Minami, S., "CCITT H.261 Compatible Mixed Bit Rate Coding of Video for ATM Networks" Jun. 1992, p. 537–543, Communications, 1992. ICC '92, IEEE International Conference.

Smith, B C, Rowe, L.A., "Compressed Domain Processing of JPEG–Encoded Images" Real–Time Imaging, GB, Academic Press, Limited, vol. 21, No. 1, Feb. 1, 1996, pp. 3–17.

\* cited by examiner

*Primary Examiner*—Young Lee (57) ABSTRACT

In a system where two types of data are to be compressed using hierarchical vector quantization (HVQ), it would be typical for there to be two compression tables, one optimized for each type of data. A boundary between the two types may occur within a block to be compressed. In this case, a third table, optimized for a block having both types of data, is used.

6 Claims, 7 Drawing Sheets area of Table 1 (2x2), Text
area of Table 2 (2x2), Mixed
area of Table 3 (4x2), Contone

FIG. 7 area of Table 1 (2x2), Text area of Table 2 (2x2), Mixed area of Table 3 (4x2), Contone

FIG. 8 area of Table 1 (4x2), Text area of Table 2 (2x2), Mixed area of Table 3 (4x2), Contone

FIG. 9

HVQ COMPRESSION FOR IMAGE BOUNDARIES

CROSS REFERENCE TO RELATED APPLICATION

This is a continuation of copending U.S. application Ser. No. 09/106,732, filed Jun. 29, 1998, the contents of which are incorporated herein by reference.

BACKGROUND OF THE INVENTION

A process for determining whether a block of pixels to be compressed is either of two types of image data, or contains a boundary between the types, so that the lossy compressor used to compress the block will be optimized for the first or second type of data, or for a transition between the two.

When data must be transmitted or stored it is usually compressed first, to reduce the transmission time or storage requirement. This is especially true of image data which can consist of four color separations of 8-bit pixels.

One method of compression is "hierarchical vector quantization" (HVQ), where a block of data can be reduced to a single codeword in a number of steps. This method is described in U.S. Pat. No. 5,602,589, and is incorporated by reference herein. This procedure can be explained most clearly by the use of a numerical example in connection with FIG. 1a of that patent. Assume that a 2 by 4 pixel block, 8 bits per pixel, is to be compressed to one 9-bit number. First, each pair of pixels is applied to a stage 1 look up table (LUT) containing 9-bit code words, each code word being associated with a two-pixel bit pattern. The table is set up so that if an exact match of the input pixel bits is not available, then a codeword associated with the closest match is output instead. The ultimate output of this stage 1 is four codewords, each describing the closest match to the bit pattern of the two input pixels. Since the exact match frequently is not possible, this compression is inherently lossy to some extent. The output of the first stage is four 9-bit codewords.

Assuming this amount of compression is not sufficient, these four codewords, each representing the bit pattern of a 1 by 2 pixel block are next applied to two stage 2 tables, resulting in a total of two 9-bit output codewords, each representing the bit pattern of a 2 by 2 pixel block. If the compression is still insufficient, these two are applied to the stage 3 table to yield the final output word, which is associated with a 2 by 4 pixel block. It can now be seen that this method is hierarchical in that a plurality of stages are used, it involves vectors since the input pixels have a directional relationship with each other, and is quantized in that a number of levels can be implemented to achieve any degree of compression.

For decompression, each codeword is simply applied to a 256 K by 64 bit LUT which outputs the bit pattern of the entire 8-pixel block.

SUMMARY OF THE INVENTION

In a printing system which uses HVQ, the data is supplied to the lossy compressor in blocks of pixels, each block being text, contone, halftone, etc. So that the compressor may configure itself optimally for the kind of data being received, the front end may supply to the compressor a mask which determines the boundaries between different kinds of data, and printing hints which specify which configuration should be used for the data that falls within each mask. In this system the mask edges must be aligned with the block edges.

The system can be improved by a system for determining if there is a boundary within a block, which can be referred to as a transition block. For example, if a boundary between a text character and a contone picture runs through a block, then a printing hint will be sent to the compressor, and table values optimized for transition blocks can be selected for that block. This would improve system performance by allowing the compressor to operate with less loss.

DETAILED DESCRIPTION OF THE INVENTION

Figure 1:
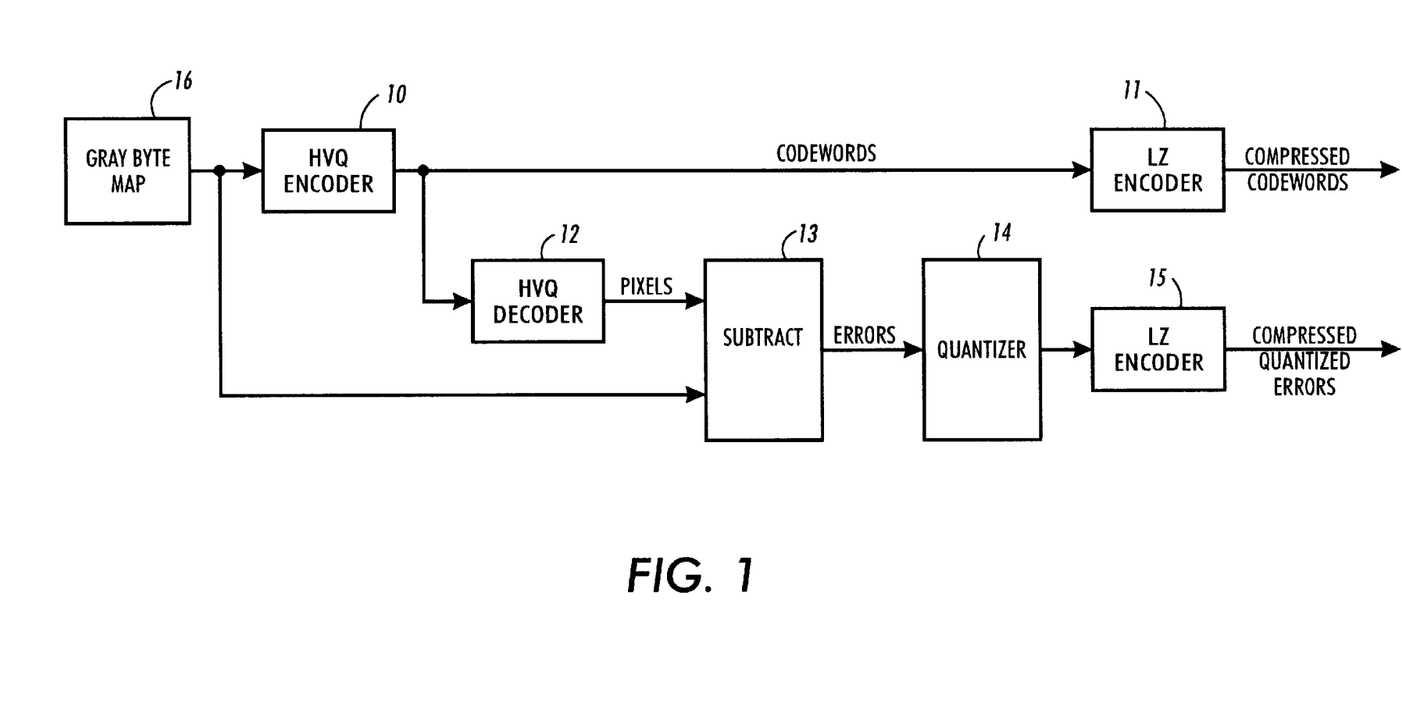
FIG. 1 is an HVQ encoder which has a parallel error channel.

The basic HVQ system can be improved by adding an error channel as shown in FIG. 1 in the upper channel the grayscale byte map 16 is applied in the usual way to an HVQ decoder 10, the output is losslessly compressed in an LZ encoder 11, and the result is sent to the decoder, usually in the form of 8 to 10-bit words.

In addition, the output of the HVQ encoder is sent to a decoder 12 in scanline format which produces a version of the original byte map which may be different from the original because of errors possibly introduced by the lossy encoder. The two byte maps are then subtracted 13, pixel by pixel, to produce error terms which, if added to the output codeword, will produce the original byte map. This subtraction can be done using an exclusive OR, which is simpler and faster and does not require a sign bit. These error terms, each a signed quantity 8-bits wide or less, can then be compressed in an LZ encoder 15 and sent to the decoder in parallel with the original output. The larger the error term, the less will be the compression ratio. In practice, small errors are not visually detectable. To limit the degradation of the compression ratio, the error term can be limited to a few most significant bits, three for example, in quantizer 14. Normally, the amount of error for a pixel will not be large enough to show up in the few MSB's, in which case there will be no error term at all.

Figure 2:
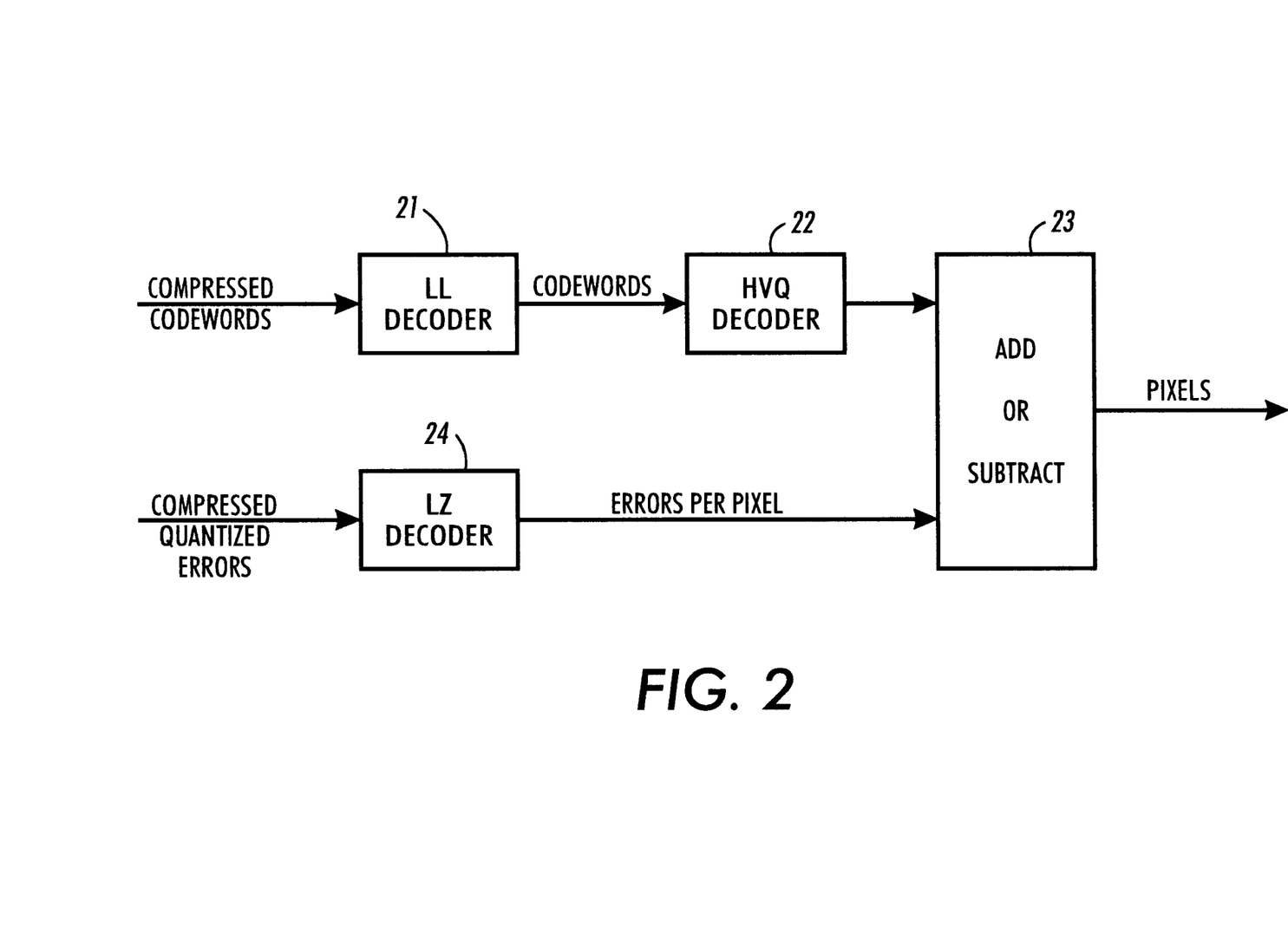
FIG. 2 is the decoder for the arrangement of FIG. 1.

The quantized error decoder is shown in FIG. 2. The compressed code words are LZ decoded in decoder 21 and HVQ decoded in decoder 22 to produce one term for the adder 23. The compressed quantized errors are LZ decoded in decoder 24 and applied as the other term to the adder 23, the output of which is output video. The adder 23 can either be an adder adding a sign bit and seven bits, or an exclusive OR if one was used to generate the error term in the encoder.

Figure 3:
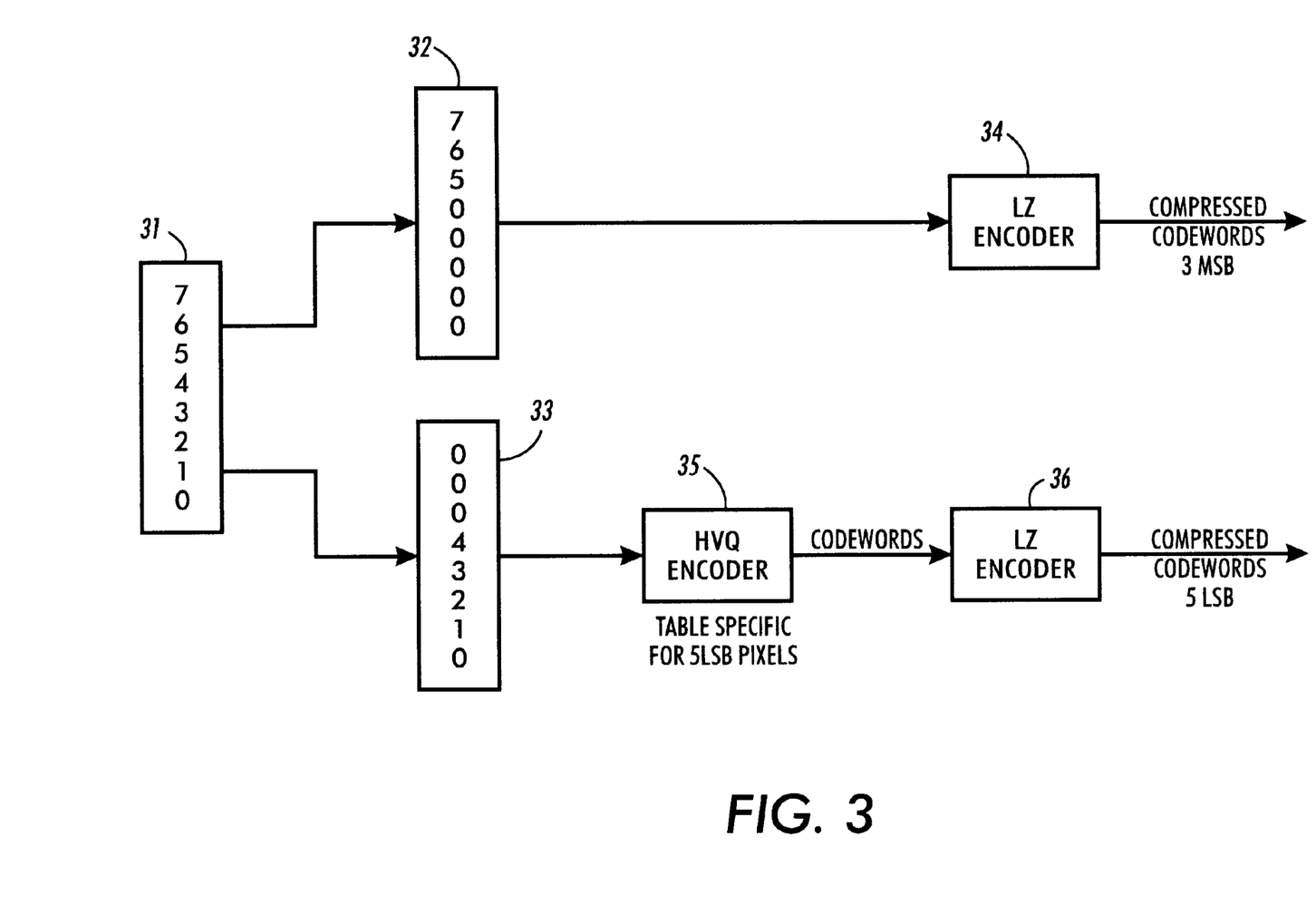
FIG. 3 is a one-channel arrangement for coding a pixel split into its most and least significant bits.
Figure 4:
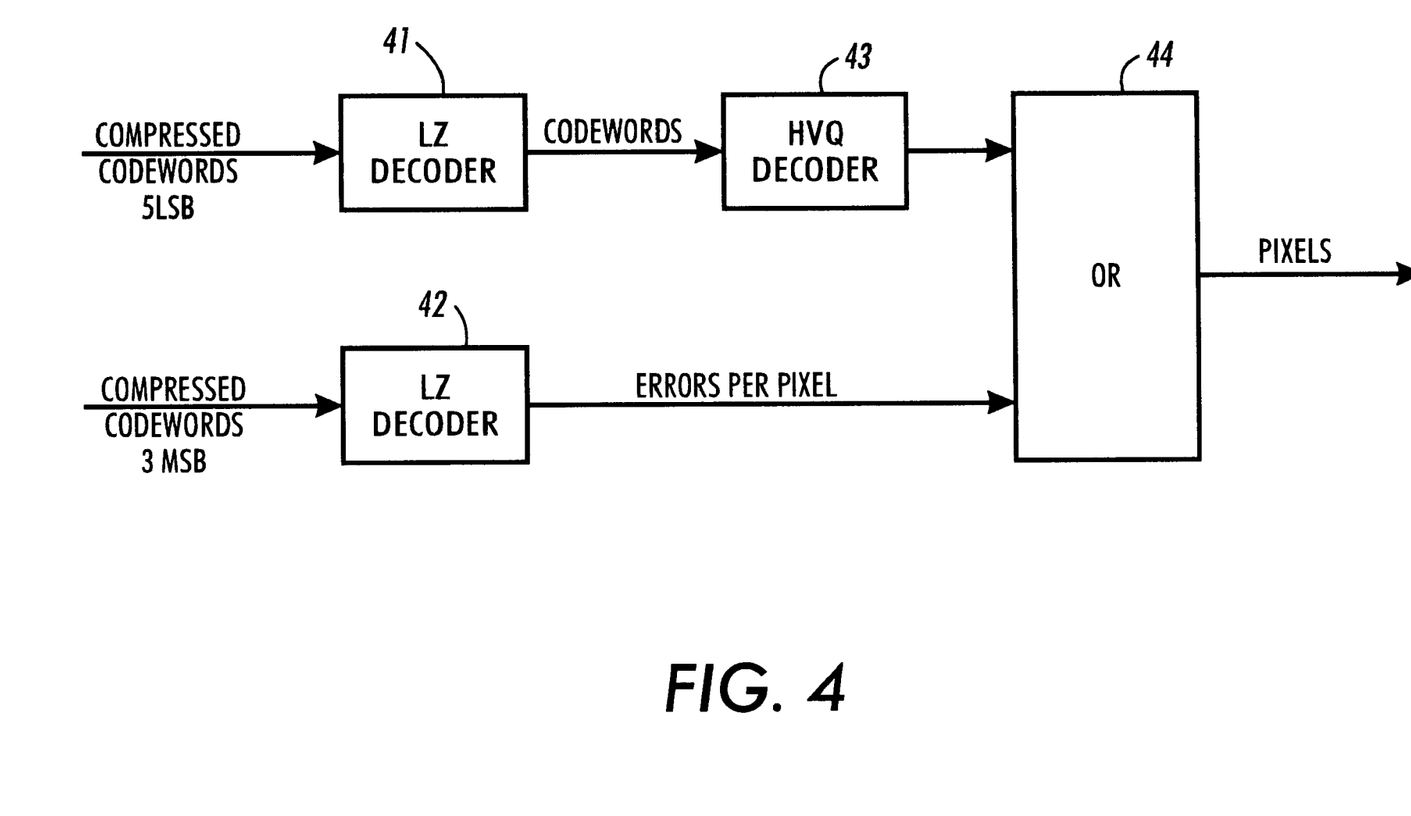
FIG. 4 is a one channel arrangement for decoding a pixel split into its most and least significant bits.

FIG. 3 shows the arrangement when a single code word 31 is split into most and least significant parts, 32, 33, and where only the least significant bits are compressed. In this case bits 0 through 4 are sent through the lossy compressor 35 while bits 5 through 7 are not. Both are then compressed using lossless LZ compression and output to the decoder shown in FIG. 4. Here again, both channels are LZ decompressed while only the LSB's are HVQ decoded. The two resultant parts are then exclusive ORed 44 together to be applied to the decoding look up table.

Figure 5:
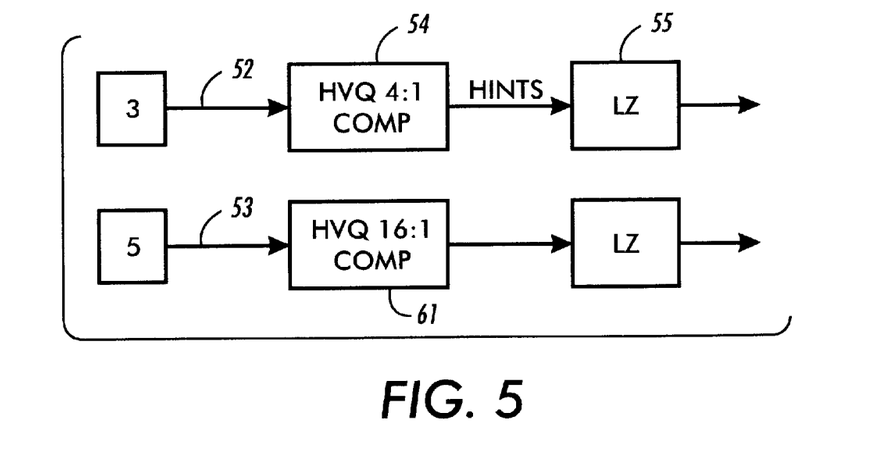
FIG. 5 is a two-channel arrangement for coding a pixel split into its most and least significant bits.

FIG. 5 is a system where a single pixel is separated into a least significant and a most significant segment, and where a separate and different compression process is used for each segment, the least significant bits being more compressed. The original pixel is separated into its most significant bits 52 and least significant bits 53. The result is that the most significant bits, being the most important, are less compressed while compression for the least bits has a better compression ratio. A programmable look-up table could be used to split the input pixel into any two segments other than the 3–5 split shown.

Figure 6:
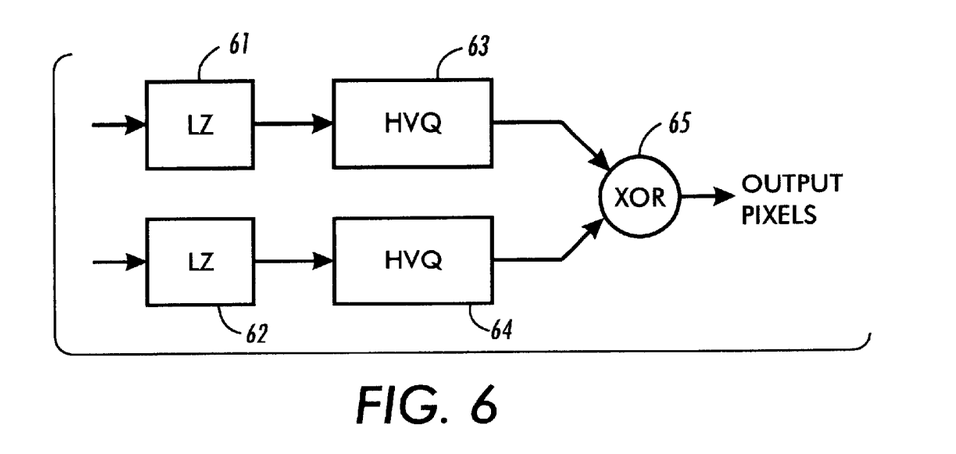
FIG. 6 is a decoder for the coder of FIG. 5.

FIG. 6 is a decoder for the encoder of FIG. 5. The two compressed outputs of FIG. 5 are applied to LZ decoders 61, 62 and HVQ 63, 64 decoded. Then both are applied to an exclusive OR gate 65 to assemble the entire pixel. Of course, if the encoder used some other combination of encoders, the decoder would use the same form of decoding. That is, more generally, that data words in a string can be divided into more and less significant bits to create two parallel strings, and then compressed using any two methods of compression where the greater compression is applied to less significant bits.

Figure 7:
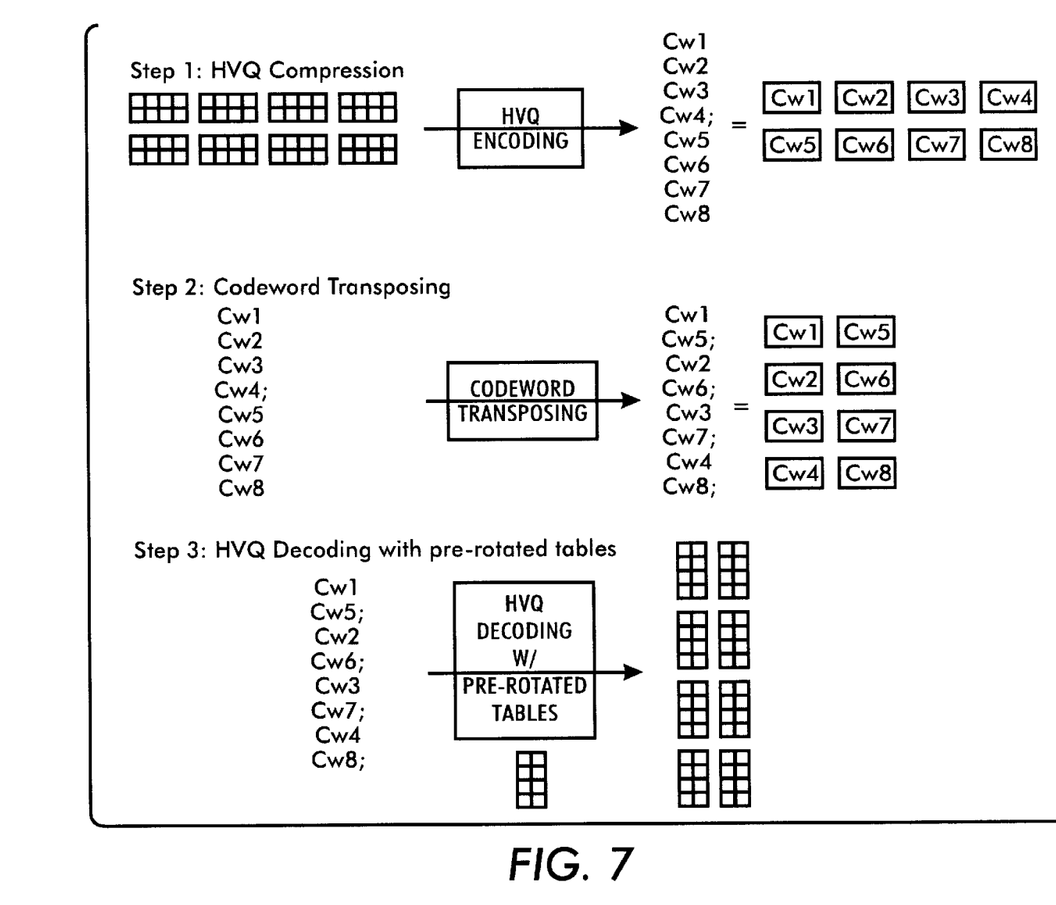
FIG. 7 shows thee prices of rotating or mirror imaging using HVQ compression.

HVQ compression is easily adapted to image rotation and mirror imaging as shown in FIG. 7. The process is shown here using the example of an original image that is four pixels high and sixteen pixels wide, and must be rotated ninety degrees clockwise and mirror imaged.

Step 1 is the usual compression process of reducing eight 8-bit segments to eight codewords Cw1 to Cw8. Step 2 is the step of rearranging the codewords into the rotated and mirror imaged order. This hardware can be in the form of wiring where the second word in, for example Cw2, is connected to the third word out, as shown. Step 2 can have several sets of wiring, each set delivering a different rotation. Finally, decoding step 3 uses a look-up table to produce pixel pattern for each segment that is properly oriented. Here again, several tables can be used to produce various orientations.

Printing hints may be incorporated into the original data supplied by the user in the original page description language to indicate to the printer how the data may best be printed. For example, a hint word may be two bits in length, and indicate one of four possibilities, that the following data is text, contone, graphics, etc. For example, if the printer is receiving data that originated as a computer generated graphic, it may use a different halftone screen than it would if the original data was screened in from a photograph.

Printing hints may be added to any HVQ channel as shown in FIG. 5. Assume that for each 4 pixel block entering into the HVQ encoder 54 there is produced one codeword 9 bits in length, contained in two 8-bit bytes, so that the first 8 bits are contained in the first byte and the last bit is contained in the second byte. Then the 2-bit hint is added. Now, each codeword plus hint is 11 bits, still contained in two bytes. The LZ encoder looks at a string of bytes, perhaps 256 bytes in length, and determines the location and size of the most recent identical pattern match. To the extent that the hint changes once or twice within that string, there will be a slightly decreased amount of compression in comparison to the amount that would have resulted with no hints. However, to the extent that the hint does not change during that time, there is no decrease in compression at all. The result is that printing hints can be supplied after an HVQ compressor but before the lossless compressor with very little effect on the compression ratio. At the output side, after the code words are LZ decompressed, but before being decoded, the hints can be extracted for later use.

The losses of an HVQ compressor can be further minimized by choosing codewords and output data patterns that have the best chance of matching the actual input data patterns. For example, first consider text. If text pixels are being encoded in 4 by 2 pixel groups, and the four input pixels in one line are black, dark gray, light gray, and white, and the input video was scanned-in text, the data most likely originally was a boundary between a black letter and a white space, so the output pixel pattern could be black, black, white, white. On the other hand, if the original input data was a scanned-in computer generated graphic, the four pixels are more likely to be a smooth decrease in density from black to white. The actual determination of the encoder codewords and patterns in the decoder look-up table are determined by statistical analysis. A representative group of text and graphic documents are passed through a test program and the best values are generated for each type.

A complication arises when a boundary passes through an input block of pixels, in which case neither text nor graphic values can be used for the entire block. The solution is to supply a third set of codewords and patterns which are generated specifically for this boundary condition. In this case a set of documents containing both text and graphics would be analyzed to produce one set of patterns, which would be used when a boundary, mixed, condition is determined to be within the block.

The boundary condition is sensed by observing the printing hints. For example, a rectangular scanned-in picture is typically located on a page of text by its x,y coordinates. When the raster output scanner beam is within the coordinates, the printing hints will indicate to the printer which codewords, look-up table entries and halftone screens to use. If the hint changes from picture to text within the block, for example, then the encoder knows that a boundary exists within the block.

Figure 8:
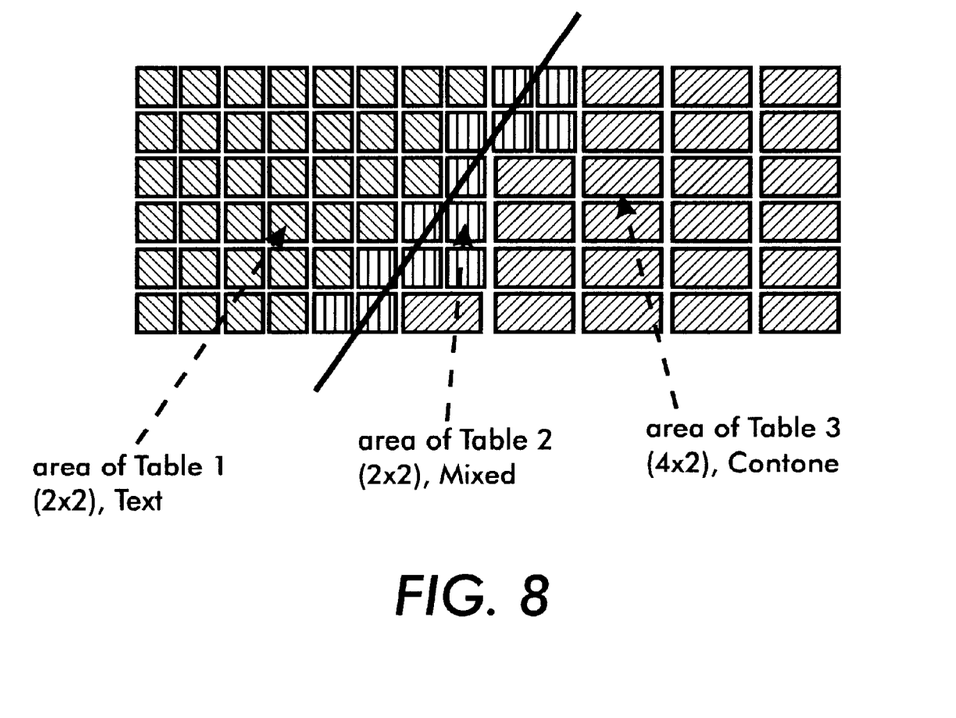
FIG. 8 shows a boundary between blocks of different sizes.

In all cases the block size must be maintained. FIG. 8 is an example of a transition between text and contone. Since different block sizes can be used in HVQ encoders for different kinds of data, the block size for the text is shown here as 2 by 2 pixels to allow greater edge detail while the block size for contone is shown here as being 4 by 2 to allow for greater compression.

Figure 9:
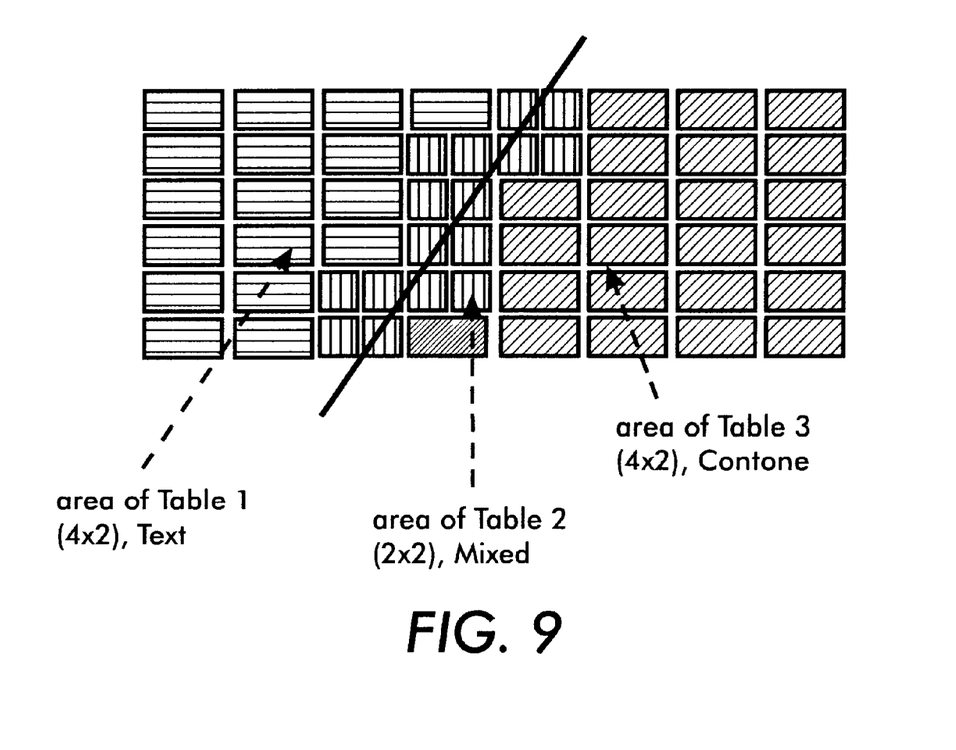
FIG. 9 shows a boundary between blocks of the same size.

If a boundary is within a 2 by 2 pixel block, that block is encoded and decoded using boundary values. In addition any contone pixels to the right of the boundary such as pixel 81 are also treated as boundary pixels if necessary so that all remaining pixels to the right of the boundary line will be within 4 by 2 pixel blocks. Similarly, in FIG. 9, showing a boundary between 4 by 2 pixels of text and contone, 2 by 2 pixel boundary blocks are used in pairs so that all remaining blocks will be 4 by 2.

While the invention has been described with reference to a specific embodiment, it will be understood by those skilled in the art that various changes may be made and equivalents may be substituted for elements thereof without from the true spirit and scope of the invention. In addition, many modifications may be made without departing from the essentials of the invention.

What is claimed is:

1. A method for compressing blocks of pixels comprising:

generating original pixels grouped into blocks of pixels, generating an image format signal associated with each block of pixels, the image format signal indicating whether there is one type of image format data selected from a group of different image format data types within the block of pixels or whether the block of pixels contains a boundary between two types of image format data, if a boundary is detected, determining the two types of image format data forming the boundary, selecting in response to the image format signal one of two compressors to use, one compressor being optimized for compression of a block of pixels containing a boundary between the two determined types of image format data, and compressing the block of pixels using the selected compressor to yield a compressed block signal;

wherein at least one of the compressors uses hierarchical vector quantization and wherein the group of image format data types includes halftone image data, contone image data, text image data and graphic image data.

2. A method for compressing blocks of pixels according to claim 1 wherein one of the types of image format data comprises halftone image data.

3. A method for compressing blocks of pixels according to claim 1 wherein one of the types of image format data comprises contone image data.

4. A method for compressing blocks of pixels according to claim 1 wherein one of the types of image format data comprises text image data.

5. A method for compressing blocks of pixels according to claim 1 wherein one of the types of image format data comprises graphic image format data.

6. A method for compressing blocks of pixels according to claim 1, further comprising generating an error signal.

* * * * *